(12) United States Patent
O'Neill (10) Patent No.: US 11,319,680 B1
(45) Date of Patent: May 3, 2022

(54) RETROREFLECTIVE TRAFFIC STRIPE FOR BOTH WET AND DRY WEATHER CONDITIONS

(71) Applicant: Mark Joseph O'Neill, Keller, TX (US)

(72) Inventor: Mark Joseph O'Neill, Keller, TX (US)

( * ) Notice: Subject to any disclaimer, the term of this patent is extended or adjusted under 35 U.S.C. 154(b) by 0 days.

(21) Appl. No.: 17/544,237

(22) Filed: Dec. 7, 2021

(51) Int. Cl.
  *G02B 5/124* (2006.01)
  *E01F 9/576* (2016.01)
  *E01F 9/512* (2016.01)
  *E01F 9/524* (2016.01)

(52) U.S. Cl.
  CPC .............. *E01F 9/578* (2016.02); *E01F 9/512* (2016.02); *E01F 9/524* (2016.02); *G02B 5/124* (2013.01)

(58) Field of Classification Search
  CPC . G02B 5/13; G02B 5/18; G02B 5/124; G02B 5/126; G02B 5/128; G02B 5/136; G02B 5/1814; G02B 5/1828; E01F 9/578; E01F 9/512; E01F 9/524
  See application file for complete search history.

(56) References Cited

U.S. PATENT DOCUMENTS

| | | | | |
|---|---|---|---|---|
| 5,759,468 A | * | 6/1998 | Smith | G02B 5/124 264/19 |
| 6,967,053 B1 | * | 11/2005 | Mullen | A42B 3/061 359/530 |
| 2020/0048847 A1 | * | 2/2020 | Retterath | G02B 5/124 |

* cited by examiner

*Primary Examiner* — Mustak Choudhury

(57) ABSTRACT

This invention is a novel retroreflective traffic stripe comprising an exposed top surface containing a widely spaced repeating pattern of linear light-turning prisms and a second repeating pattern of linear prisms between the light-turning prisms, over a bottom surface containing cube corner retroreflective prisms. The two types of top surface prisms are operable under dry and wet weather conditions, respectively. Both types of top surface prisms are configured to use refraction and reflection to redirect light from distant headlights into a downward direction onto the bottom surface of the traffic stripe under dry and wet weather conditions, respectively. Cube corner retroreflective prisms on the bottom surface accept the light and return it in the opposite direction.

19 Claims, 8 Drawing Sheets

RETROREFLECTIVE TRAFFIC STRIPE FOR BOTH WET AND DRY WEATHER CONDITIONS

BACKGROUND OF THE INVENTION

This invention relates to retroreflective traffic stripes which are illuminated at night by the headlights of vehicles (cars, SUVs, trucks, and motorcycles) and which return a portion of the incident illumination by reflection to the drivers and sensors of these vehicles. Such traffic stripes are applied to or attached to the substantially horizontal surfaces of highways and widely used as (1) longitudinal lane delineation markers parallel to the lanes of traffic between lanes, (2) longitudinal road edge markers also parallel to the lanes of traffic, and (3) transverse markers perpendicular to the lanes of traffic at crosswalks and intersections.

This invention represents an important improvement to two previous inventions by the same inventor:

a. U.S. Pat. No. 10,794,021, "Retroreflective Traffic Stripe," issued Oct. 6, 2020, hereafter referred to as the '021 patent. This previous invention relates to a transparent polymer traffic stripe which uses widely spaced apart light-turning prisms on its top surface to redirect incident rays from distant headlights downward onto cube corner prisms on its bottom surface. The cube corner prisms then retroreflect the light along a reverse path back to the driver and sensors of the vehicle with the headlights. This previous invention offers unprecedented performance under dry road conditions, with a retroreflectivity proven in certified testing to be hundreds of times higher than conventional traffic stripes which use embedded glass or ceramic beads in paint.

b. U.S. Pat. No. 11,124,935, "Retroreflective Traffic Stripe for Both Dry and Wet Weather Conditions," issued Sep. 21, 2021, hereafter referred to as the '935 patent. This previous invention extended the high retroreflectivity of the invention in the '021 patent to not only work under dry road conditions but also under wet road conditions, including a fully submerged underwater traffic stripe. The invention in the '935 patent accomplishes this wet performance by using on its bottom surface a different configuration of cube corner prisms between light-turning prisms than under the light-turning prisms. Specifically, the invention in the '935 patent uses cube corner prisms with substantially vertical optical axes under the light-turning prisms and cube corner prisms with substantially tilted optical axes between the light-turning prisms. These tilted cube corner prisms efficiently accept and retroreflect light rays from distant headlights after these rays are refracted by the layer of water above the traffic stripe.

The previous invention presented in the '021 patent is presently being developed under a National Academies-funded contract with the inventor's company, Mark O'Neill, LLC, as part of the competitive program known as the Transportation Research Board (TRB) Innovations Deserving Early Analysis (IDEA) program. The contract title is "A Retroreflective Road Lane Marking Tape 1,000× Brighter Than Existing Technology," and the period of performance is from Jan. 1, 2021 through Mar. 31, 2022. The first fully functional prototypes of the new traffic stripe have been fabricated and successfully tested in a certified laboratory at unprecedented retroreflectivity levels several hundred times higher than conventional painted traffic stripes with embedded glass or ceramic beads.

The present invention uses a totally different approach from that presented in the '935 patent to also extend the high retroreflectivity of the previous invention in the '021 patent to not only work under dry road conditions but also under wet road conditions, including a fully submerged underwater traffic stripe. The present invention accomplishes this wet performance by using a second type of prisms on the top surface between the widely spaced light-turning prisms. Specifically, the present invention retains on the top surface the repeating pattern of widely spaced light-turning prisms disclosed in the '021 and '935 patents but adds a second set of triangular prisms on the top surface between the repeating pattern of light-turning prisms. The present invention thus accomplishes the same goal as the invention in the '935 patent but does so by changing the structure of the top surface of the new traffic stripe rather than the structure of the bottom surface of the traffic stripe.

In the present invention, the bottom surface of the traffic stripe contains only one type of cube corner prisms with substantially vertical or slightly tilted optical axes. This repeating bottom surface of the same type of cube corner prisms is much easier to manufacture than the more complex cube corner prismatic structure of the '935 patent which requires two different types of cube corner prisms located in different regions of the traffic stripe along its length. Indeed, currently mass-produced and commercially available cube corner prismatic sheeting widely used in traffic signs can be used for the bottom surface of the present invention, in combination with the new top surface prismatic pattern disclosed in this specification. Unlike the present invention, the invention described in the '935 patent did not allow for the use of such commercially available cube corner sheeting which has been widely used for traffic signs for many years.

The present invention achieves outstanding retroreflectivity under both dry and wet conditions by using a novel prismatic top surface comprising at least two different types of prismatic structures:

a. Light-turning prisms for dry weather performance. These prisms accept light from distant headlights of an approaching vehicle and redirect such light downward onto cube corner prisms, which retroreflect the light in a reverse direction back to the driver and sensors of the vehicle. These dry weather light-turning prisms typically use a substantially vertical surface facing the vehicle, and a second tilted surface which reflects light from nearly horizontal to nearly vertical and the reverse by total internal reflection (TIR). In a preferred embodiment the first surface of the light-turning prism is vertical, and the second surface is tilted by approximately 45 degrees. These light-turning prisms are typically spaced apart along the traffic stripe by a large distance compared to the height of the prisms, typically 40-50 times larger than the height of the prisms to minimize light blockage for incident and retroreflected rays. To offer the same retroreflective performance for both directions of traffic, light-turning prisms can be deployed in pairs, one facing one direction of travel and the other facing the opposite direction of travel.

b. Prisms between light-turning prisms for wet weather performance. These prisms accept light from distant headlights of an approaching vehicle after this light is first refracted by a layer of water above the traffic stripe and then redirect such light downward onto cube corner prisms, which retroreflect the light in a reverse direction back to the driver and sensors of the vehicle. Typically, the light from distant headlights is nearly grazing in incidence angle onto the water layer, which refracts the light at an angle of about 49 degrees off vertical due to water's refractive index of 1.33. These prisms typically have two highly tilted faces, the first to accept the incident rays and the second to reflect the rays downward onto cube corner prisms using total internal reflection (TIR). After retroreflection by the cube corner prisms on the bottom surface of the traffic stripe, the rays return in the opposite direction once again undergoing TIR at one surface of each top surface prism. In a preferred embodiment these prisms are configured as isosceles triangles with a tilt angle of about 66 degrees off horizontal for each prism face. Such isosceles triangle prisms offer the same retroreflective performance for traffic approaching from either direction, which is desirable.

For present retroreflective traffic stripes used on road surfaces, the most commonly used approach to date is to embed glass or ceramic beads in the top surface of the white or yellow paint comprising the traffic stripe to achieve a small amount of retroreflection of the light from approaching headlights back toward the driver and sensors of the vehicle. These beads are not very effective, especially in wet weather, and are easily broken or dislodged from the top surface of the paint by traffic running over them and by snowplows in colder climates.

What is needed to provide exceptionally bright traffic stripes under dry weather conditions is a prismatic transparent polymer film which can efficiently accept high incidence angle light from approaching headlights, turn this light by about 90 degrees, and send this light on to an array of cube corner retroreflective prisms, which then efficiently reverses the light path and sends the light back to the driver and sensors of the vehicle. The previous inventions, described in the '021 and '935 patents, and the present invention elegantly fulfill this need for dry road conditions. By combining a top layer of light-turning prisms with a bottom layer of cube corner retroreflective prisms, an extremely efficient, moderate cost new technology for traffic stripes has been invented, which could save many lives on the highways of the world. The new traffic stripe offers hundreds of times the retroreflective brightness of conventional painted traffic stripes with embedded glass or ceramic beads under dry conditions.

The present invention described in this specification adds excellent retroreflective brightness under wet road conditions. Under extremely wet conditions, the light-turning prisms are no longer optically functional because they are submerged under runoff rainwater which eliminates their capability to turn the incident light rays downward. Fortunately, however, there is space for another large set of top surface prisms between the widely spaced apart first set of repeating light-turning prisms. The present invention uses a different configuration of top surface prisms between light-turning prisms to provide excellent retroreflectivity for incident rays from distant headlights which are incident at grazing angles onto the water layer above the traffic stripe. The present invention thereby offers a novel traffic stripe capable of improving retroreflectivity over conventional glass-beaded painted traffic stripes under both dry and wet conditions. The present invention will thereby save many lives on roadways whether the dark night conditions involve clear weather conditions or stormy weather conditions. The present invention will work well for vehicles driven by humans or for connected and automated vehicles (CAVs) partially or totally driven by computers using sensors to "see" the traffic stripes which help to guide the vehicle's movement. The present invention will increase the retroreflective brightness for both human drivers and connected and automated vehicles (CAVs) which use sensors to receive the retroreflected rays to provide lane information to guide the vehicle's path.

BRIEF SUMMARY OF THE INVENTION

This invention is a novel retroreflective traffic stripe comprising a widely spaced repeating pattern of linear light-turning prisms over cube corner retroreflective prisms. The light-turning prisms comprise at least two exposed surfaces, one approximately vertical facing the headlights of oncoming traffic, and another opposing the first and sloped by approximately 45 degrees. The approximately vertical surface efficiently accepts light from the headlights and transmits such light to the sloped surface which reflects such light downward using total internal reflection (TIR) whereafter such light intercepts an array of cube corner retroreflective prisms, which together reflect such light back upward in approximately the reverse direction. Such reflected light once more encounters the sloped face of the light-turning prisms which again reflects such light using TIR toward the approximately vertical surface, whereafter such light exits and returns toward the headlights and, more importantly, toward the eyes of the driver and the sensors of the vehicle. The combined effect of the light-turning prisms on the top surface of the traffic stripe and the cube corner prisms on the bottom surface of the traffic stripe provide unprecedented retroreflectivity under dry road conditions.

The invention employs an array of cube corner retroreflective prisms below a widely spaced repeating pattern of light-turning prisms in an optimized configuration to provide a new type of retroreflective traffic stripe, with hundreds of times greater brightness than the current state of the art. The invention comprises micro-prismatic polymer sheet made by well-established, high-speed, cost-effective, roll-to-roll embossing processes or other mass-production processes such as injection molding or compression molding. The leading candidate materials for the micro-prismatic sheet are transparent robust polymers such as thermoplastic polyurethane, acrylic, polycarbonate, silicone, fluoropolymer, and combinations thereof.

In the preferred embodiment, the invention requires no metallization of the surfaces of the light-turning prisms or the cube corner prisms, which perform their reflections using the well-known phenomenon of total internal reflection (TIR). TIR is ensured by using polymer materials with refractive indices above 1.4 and by surrounding the outside surfaces of the prisms with air. The preferred candidate materials inherently meet the refractive index requirements (1.50 for thermoplastic polyurethane, 1.49 for acrylic, 1.58 for polycarbonate, 1.41 for silicone, and 1.40 for fluoropolymers such as ETFE).

The invention may be produced in various ways. The light-turning prisms and the cube corner retroreflective prisms may be embossed or molded onto separate individual transparent polymer sheets and laminated together with a transparent adhesive, or they may be embossed or molded on opposite sides of the same sheet of transparent polymer. The latter approach is preferred for high robustness and low cost.

The invention may also use films below the cube corner retroreflective prisms to impede moisture penetration and thereby create a dry air cavity in contact with the cube corner retroreflective prisms, thereby enabling such prisms to perform their reflective function using total internal reflection (TIR) rather than metallic reflection. Alternately, these cube corner retroreflective prisms may be metallized with aluminum or silver or other metal to perform their reflective function using metallic reflection. The TIR approach is preferred for higher retroreflectivity and better full-spectrum appearance.

The invention may use either total internal reflection (TIR) or metallic reflection on the sloped surfaces of the linear light-turning prisms, with TIR the preferred approach.

The invention may use an adhesive layer beneath the other layers to facilitate bonding of the material to the roadway surface. Many types of different adhesives may be used, from liquid or gel adhesives to pressure sensitive adhesives (PSAs).

The invention may be made in roll form to enable machine-aided continuous application of traffic stripes to long sections of highways and roads.

The invention may be made in segmented form to enable application of segments end to end on long sections of highways and roads.

The invention may include a light-turning prism configuration with a third surface connecting the vertical surface and the approximately 45-degree sloped surface of the prism to provide traffic damage mitigation.

The invention may include structural features that protrude above the tops of the light-turning linear prisms to resist the pressure of traffic tires and snowplows and thereby protect and prevent damage to the light-turning prisms.

The invention may be used with light-turning prismatic features facing opposite directions to be visible from vehicles traveling in both directions.

The invention may include a white back film beneath the cube corner prisms to provide daytime brightness for the traffic stripe under sunlight illumination.

The invention may include colored pigment in the prismatic polymer material, such as yellow, red, or other colors to impart color to the retroreflected rays from headlights at night, or to the reflected rays from sunlight during the day.

Under very wet road conditions, water may cover the light-turning prisms which will then not perform their optical function. Fortunately, the inventor has discovered a novel solution to this wet road retroreflectivity problem. Since the light-turning prisms are widely space apart along the length of the traffic stripe, there is ample space for a large number of a second type of top surface prisms between these widely space light-turning prisms. If these second type of top surface prisms are properly configured to accept and redirect light rays from the distant headlights after these rays are first refracted by the layer of water above the traffic stripe, they can work in combination with the bottom layer of cube corner prisms to provide a significant retroreflectivity even when the traffic stripe is completely submerged under rainwater runoff. Under dry conditions this second type of prisms between light-turning prisms provides no optical function. Only the first type of light-turning prisms is functional under dry conditions. The present invention uses a novel configuration comprising a different type of top surface prisms between the light-turning prisms, with the different type of top surface prisms providing wet retroreflectivity when the traffic stripe is fully submerged under water. On the bottom surface of the polymeric traffic stripe, cube corner prisms are employed over the full surface, with the optical axes of these cube corner prisms approximately vertical or slightly tilted. Under dry conditions, the light-turning prisms redirect rays from distant headlights downward onto the cube corner prisms which efficiently retroreflect the rays along a reverse path back to the driver or sensors of the vehicle. Under very wet conditions, the second type of prisms between the widely spaced light-turning prisms redirect rays from distant headlights, after these rays are first refracted by the water layer above the traffic stripe, downward onto the cube corner prisms which efficiently retroreflect the rays along a reverse path back to the driver or sensors of the vehicle. By using both types of top surface prisms in the same traffic stripe, the retroreflectivity will be hundreds of times brighter than conventional traffic stripes under dry conditions, and many times brighter than conventional traffic stripes under wet, submerged conditions.

The widely space light-turning prisms typically comprise about 10-15% of the running length of the traffic stripe in both the '021 patent invention and the '935 patent invention and in the present invention. This leaves about 85-90% of the running length of the traffic stripe non-functional in the '021 patent invention. The '935 patent uses this 85-90% region under wet conditions by employing a different type of cube corner prism on the bottom surface between light-turning prisms. The present invention uses this 85-90% region under wet conditions by adding a second type of top surface prism over this region. It is simpler to construct tooling and to mass produce the much simpler and larger top surface prisms of the present invention than the complex pattern of smaller bottom surface cube corner prisms in the invention of the '935 patent. Both approaches will provide high retroreflectivity under submerged conditions, but the present invention is simpler and easier to produce than the invention in the '935 patent. In summary, without adding any cost to the traffic stripe of the '021 patent, high wet retroreflectivity can be accomplished by the present invention simply by adding a second type of top surface prisms between the repeating pattern of light-turning prisms. By making use of this previously wasted portion of the traffic stripe in the invention described in the '021 patent, high submerged retroreflectivity is accomplished by the present invention.

BRIEF DESCRIPTION OF THE DRAWINGS

For all of the figures, the numerals shown in the drawings identify these key elements of the invention:
1. Repeating Pattern of Dry Weather Light-Turning Prisms on Top Surface of Traffic Stripe for Dry Weather Retroreflectivity
2. Repeating Pattern of Wet Weather Prisms on Top Surface of Traffic Stripe Between
Light-Turning Prisms for Wet Weather Retroreflectivity
3. Cube Corner Prisms on Bottom Surface of Traffic Stripe
4. Left-Facing Dry Weather Light-Turning Prism
5. Right-Facing Dry Weather Light-Turning Prism
6. Raised Traffic Protection Bar Taller than Dry Weather Light-Turning Prisms
7. Individual Wet Weather Light-Turning Prisms
8. Incident and Retroreflected Rays Under Dry Weather Conditions
9. Incident and Retroreflected Rays Under Wet Weather Conditions
10. Water Level Over Traffic Stripe
11. Air Pocket
12. White Polymer Film The present invention is a transparent polymer traffic stripe which provides high retroreflectivity at night for light rays from approaching headlights of vehicles.
FIG. 1-A shows the traffic stripe in cross-sectional view from a side viewpoint. Traffic is approaching from the left and right directions of this cross-sectional view. The widely spaced repeating pattern 1 of light-turning prisms provides dry weather retroreflectivity in the same manner as fully described in the previous '021 and '935 patents. Between the repeating pattern 1 of light-turning prisms, an array 2 of triangular prisms provides wet weather retroreflectivity. This array of wet weather prisms 2 is located below the plane of the light-turning prismatic pattern 1. On the bottom surface of the traffic stripe, cube corner retroreflective prisms 3 cover the entire surface. The prismatic patterns 1 and 2 on the top surface work in cooperation with the cube corner prisms 3 on the bottom surface to provide unprecedented retroreflectivity under both dry and wet weather conditions, respectively. The light-turning prismatic pattern 1 provides dry weather retroreflectivity while the array 2 of triangular prisms provides wet weather retroreflectivity, both in cooperation with the cube corner prisms 3 on the bottom surface. Note that the transparent polymer traffic stripe does not require the use of paint or glass beads or ceramic beads or metallized surfaces to achieve high levels of retroreflectivity. The principle of total internal reflection (TIR) is used in all three types of prisms, (i) dry weather light-turning, (ii) wet weather triangular, and (iii) cube corner retroreflective prisms, to provide retroreflectivity for the present invention.

FIG. 1-B provides the dimensions for a preferred embodiment of the present invention. These dimensions are not meant to limit the scope or spirit of the invention, only to show the configuration of the currently preferred embodiment.

FIG. 1-C shows a blow-up drawing of the prismatic geometry presented in FIGS. 1-A and 1-B. Note that dry weather light-turning prisms 4 and 5 face opposite directions of traffic to provide equal levels of retroreflectivity for the headlights of approaching vehicles from either direction. Note also that a non-optical structural element 6 is placed between light-turning prisms 4 and 5 to mitigate traffic damage. This structural bar 6 is taller than the light-turning prisms 4 and 5 to encounter vehicle tires before the light-turning prisms. Structural bars 6 can be placed at various locations on the present invention to mitigate traffic damage while minimizing light blockage for incident rays coming from the headlights and for retroreflected rays heading back to the driver and sensors of the vehicle. The individual wet weather prisms 7 are isosceles triangles in this preferred embodiment to provide equal wet weather retroreflectivity in both directions of travel. Other geometries of the dry weather light-turning prisms and the wet weather triangular prisms can be employed for one-directional traffic stripes, as anyone of ordinary skill in the art will recognize. These alternate geometries clearly fall within the scope and spirit of the present invention. Note that the prisms can also incorporate flat or rounded tops to further mitigate traffic damage, as shown for example by prisms 4 and 5. Various alternate prismatic geometries may be selected by those of ordinary skill in the art after the present invention becomes public knowledge. These alternate configurations will also fall within the scope and spirit of the present invention. FIG. 1-C also shows the smaller cube corner prisms 3 on the bottom surface of the traffic stripe.

FIG. 2 shows how the innovative prismatic structure of the present invention previously shown in FIG. 1 operates optically under dry and wet weather conditions. Light rays 8 are shown in FIG. 2-A for dry weather conditions. These light rays 8 represent both incident rays from approaching headlights and retroreflected rays heading back to the driver and sensors of the vehicle. Both sets of rays 8, incoming and retroreflected, follow nearly identical paths in opposite directions. Note that under dry conditions, the wet weather triangular prisms perform no function at all, since they are below the light rays moving in both directions. Note also that the repeating pattern of dry weather light-turning prisms uses a wide spacing between the patterns to minimize light blockage for rays traveling in either direction, incident or retroreflected. The dry weather light-turning prisms redirect incident light downward onto cube corner prisms on the bottom surface of the traffic stripe, which retroreflect the rays back along the same path in the opposite direction.

Light rays 9 are shown in FIG. 2-B for wet weather conditions. A layer of water with a top surface 10 covers the entire traffic stripe in FIG. 2-B. Light rays 9 intercept the top surface of the water at near grazing incidence and are refracted by the water to a more inclined direction corresponding to about 49 degrees off vertical due to the 1.33 refractive index of water. These refracted rays 9 next encounter the triangular prisms between light-turning prisms and are redirected downward onto cube corner prisms on the bottom surface of the traffic stripe, which retroreflect the rays along the same path in the opposite direction. Note that the dry weather light-turning prisms have no function under wet conditions when the traffic stripe is fully submerged under water. Similarly, the wet weather prisms have no function under dry conditions. Thus, the two different types of top surface prisms operate under different weather conditions to provide excellent retroreflectivity under all types of weather conditions.

FIG. 2-C shows a blow-up view of the operation of the dry weather prisms including incident and retroreflected rays 8. FIG. 2-D shows a blow-up view of the operation of the wet weather prisms including incident and retroreflected rays 9. Note that the dry weather and wet weather prisms perform similar optical functions but require totally different configurations due to the lack of presence or presence of a layer of water over the traffic stripe.

FIGS. 2-C and 2-D show that the cube corner prisms 3 on the bottom of the traffic stripe perform the same retroreflective function under both dry and wet conditions, returning the incident rays in the opposite direction. These retroreflected rays eventually return to the driver and sensors of the vehicle with the headlights which illuminated the traffic stripe.

Incident light rays 8 and 9 in FIG. 2 follow the international standard geometry for testing traffic stripes based on a horizontal distance to the approaching headlights of 30 meters and a vertical distance of the headlights above the road surface of 0.65 meter. This leads to an incidence angle 88.76 degrees off vertical or 1.24 degrees (arc tangent of 0.65/30) off horizontal. The applicable standards include ASTM Standards D4061, E809, and E1710, and CEN Standard EN1436. For the dry weather condition rays 8, the retroreflectivity will be much higher than for the wet weather condition rays 9 because of the transmittance losses at the air-water interface 10 for both incident and retroreflected rays. The round-trip transmittance for incident and retroreflected rays at this air-water interface is only about 1.6% because of the high incidence angle of 88.76 degrees in both directions and the 1.33 refractive index of water. In contrast, the round-trip transmittance for incident and retroreflected rays at the air-polymer interface of the vertical surface of the light-turning prisms under dry conditions will be about 90%. Thus, the retroreflectivity will be about 50-60 times greater for dry weather conditions than for wet weather conditions for the present invention. However, since the dry weather performance of the present invention is several hundred times higher than the proposed U.S. standard retroreflectivity for high-speed roadways, the wet weather performance will still be substantially greater than for any previous traffic stripe.

FIG. 3 shows two three-dimensional isometric blow-up views of the present invention, namely, a top view in FIG. 3-A and a bottom view in FIG. 3-B. The top surface of the transparent polymer traffic stripe includes dry weather light-turning prisms 4 and 5 facing in both directions of traffic. The top surface further includes taller structural bars 6 to provide some protection of the light-turning prisms 4 and 5 from traffic damage. In between repeating patterns of dry weather light-turning prisms, wet weather prisms 7 are located. These wet weather prisms 7 are typically triangular in shape. All of these top surface features extend across the width of the traffic stripe. On the bottom of the traffic stripe, cube corner retroreflective prisms 3 cover the entire bottom surface. The bottom surface cube corner prisms 3 are typically smaller in dimension than the top surface prisms 4, 5, and 7, for optical performance benefits fully explained in the '021 patent.

FIG. 4-A shows a longitudinal traffic stripe running parallel to a roadway, such as an edge stripe or a lane stripe or a centerline skip stripe. The repeating pattern of light-turning prisms 1 runs across the width of the stripe at a periodic distance of 4.4 cm along the length of the stripe in this preferred embodiment. FIG. 4-A shows a short length of stripe, about 88 cm, which would typically represent a small section of a much longer stripe along the highway. FIG. 4-A shows a stripe width of about 10 cm, which is typical of American highway stripes. European stripes are typically about 15 cm wide. Either width or any other width can be employed for the present invention. Similarly, the length of the stripe for the present invention can be either continuous or segmented. The inventor presently sees some advantages in a segmented stripe using small lengths of about 80-120 cm installed end to end along the highway. This approach would enable mass production of the individual small lengths by methods such as injection molding and compression molding. A continuous length would require more sophisticated roll-to-roll manufacturing methods. Either approach falls clearly within the scope and spirit of the present invention.

FIG. 4-B shows another embodiment of the present invention for transverse traffic stripes running perpendicular to the highway, such as crosswalk stripes or intersection stripes. For these transverse stripes, the repeating pattern of light-turning prisms 1 must be oriented perpendicular to the direction of traffic as shown in FIG. 4-B. A cross-sectional view of the stripes of FIGS. 4-A and 4-B would be the same, but since the stripes face traffic in different directions, the view from above is different as anyone of ordinary skill in the art would appreciate. The overall dimensions of a crosswalk stripe may be similar to a longitudinal stripe, such as 10 cm width. The length of the crosswalk stripes can be either continuous or segmented. FIG. 4-B shows an example segmented length of about 100 cm. Any width or length of this embodiment shown in FIG. 4-B clearly falls within the scope and spirit of the present invention.

FIG. 5-A shows a cross-sectional view of three wet weather triangular prisms 2 in a preferred embodiment. In FIG. 5-A, traffic could be approaching from either the left or right in this view, with rays 9 shown from headlights approaching from the right for this example ray trace. To function equally well in both directions of traffic, the wet weather prisms 2 are isosceles triangles. Light rays 9 are shown in FIG. 5-A arriving at the wet weather prisms 2 after refraction by a layer of water above the traffic stripe. Since water has a refractive index of 1.33, these rays arrive at about 49 degrees (arc sine of 1/1.33) off vertical or 41 degrees off horizontal. After further refraction by the first surface of the triangular prism, the rays 9 encounter the second surface of the triangular prism where total internal reflection (TIR) occurs if the triangular geometry has been optimized. A major portion of the rays 9 undergo TIR, but a small portion of the rays can miss the second surface of the prism and not undergo TIR, as shown in FIG. 5-A. If the prism angles are selected at 66 degrees, 84% of the rays 9 will undergo TIR. After TIR, these rays 9 proceed downward at an angle of 87 degrees off horizontal or 3 degrees off vertical, as shown in FIG. 5-A. Thereafter, such rays will encounter cube corner prisms on the bottom surface of the traffic stripe and be retroreflected back in the opposite direction as previously shown in FIG. 2-D.

FIG. 5-B shows the effect of varying the prism angles from 60 degrees to 66 degrees in terms of optical effectiveness, which is defined as the fraction of incident rays 9 which undergo TIR. Note the value of 84% for the 66-degree prism angles in FIG. 5-B, in substantial agreement with FIG. 5-A. For the presently preferred polymer material, aliphatic thermoplastic urethane (TPU), the refractive index N is about 1.5. As shown by the vertical dashed line in FIG. 5-B, TIR fails to occur for rays 9 if the prism angles exceed about 66.5 degrees. Thus, the inventor has selected 66 degrees as the best prism angle value for the presently preferred embodiment of the present invention. Those of ordinary skill in the art will easily determine the best prism angles for other polymer materials with different refractive indices.

FIG. 6 shows an alternate embodiment of the wet weather prisms 2 if equal performance is not required for both directions of traffic. Rays 9 have originated from approaching headlights from the right side of FIG. 6. Rays 9 have been refracted by a layer of water above the traffic stripe before they arrive at wet weather prisms 2 which are non-isosceles in geometry for this alternate embodiment. These rays 9 enter the first prism face and are thereafter reflected by TIR at the second prism face downward onto cube corner retroreflective prisms on the bottom of the traffic stripe. The rays 9 are then retroreflected by the cube corner prisms on the bottom surface of the traffic stripe and return in the opposite direction to the driver and sensors of the vehicle. The 52% effectiveness of the prisms 2 in this alternate embodiment is not as high as the 84% shown previously for isosceles prisms 2 in FIG. 5-A, but this embodiment will still provide good wet weather retroreflectivity for traffic approaching from the right side of FIG. 6. This and other alternate embodiments clearly fall within the scope and spirit of the present invention.

FIG. 7 shows another preferred embodiment of the present invention. The repeating pattern of dry weather light-turning prisms 1 and the repeating pattern of wet weather prisms 2 on the top surface of the traffic stripe retain their configuration and optical operation previously described for the present invention. Similarly, the cube corner retroreflective prisms 3 on the bottom surface of the traffic stripe retain their configuration and optical operation previously described for the present invention. But a new feature, an enclosed air pocket 11, has been added to the traffic stripe.

This enclosed air pocket 11 ensures that cube corner prisms 3 can provide TIR under both wet and dry conditions. This enclosed air pocket 11 is created by the addition of a white polymer film 12 added below the cube corner prisms 3. This white polymer film 12 also provides daytime visibility of the traffic stripe under sunlight illumination. Such white films 12 and air pockets 11 have been widely and successfully used for decades in mass-produced cube corner retroreflective sheeting for traffic signs. The present invention includes the novel top surface prismatic patterns 1 and 2 which enable the previously developed cube corner prismatic traffic sign sheeting to function in a traffic stripe under grazing incidence headlight illumination for both dry and wet weather conditions.

FIG. 8 shows another embodiment of the present invention. The repeating pattern of dry weather light-turning prisms 1 and the wet weather prisms 2 are protected from traffic damage by taller structural bars 6 which are placed between light-turning prisms and intermittently along the length of the traffic stripe in positions that block very little light coming from the headlights and returning to the driver and sensors of the vehicle. These bars 6 can be molded into the polymer traffic stripe at the same time as the various prismatic structures, thereby adding minimal cost to the traffic stripe.

DETAILED DESCRIPTION AND BEST MODE OF IMPLEMENTATION

The present invention is a novel retroreflective traffic stripe offering unprecedented brightness at night when illuminated by headlights from vehicles on highways under both dry and wet road conditions. The present invention represents an important improvement to the previous inventions by the same inventor described in the '021 and the '935 patents. The present invention comprises a thin transparent polymer sheet with prisms of three distinct types, two of which are embossed or molded onto the top surface, and the third of which is embossed or molded onto the bottom surface of the sheet. The invention is best understood by referring to the attached drawings, which were briefly discussed in the previous paragraphs.

Figure 1:
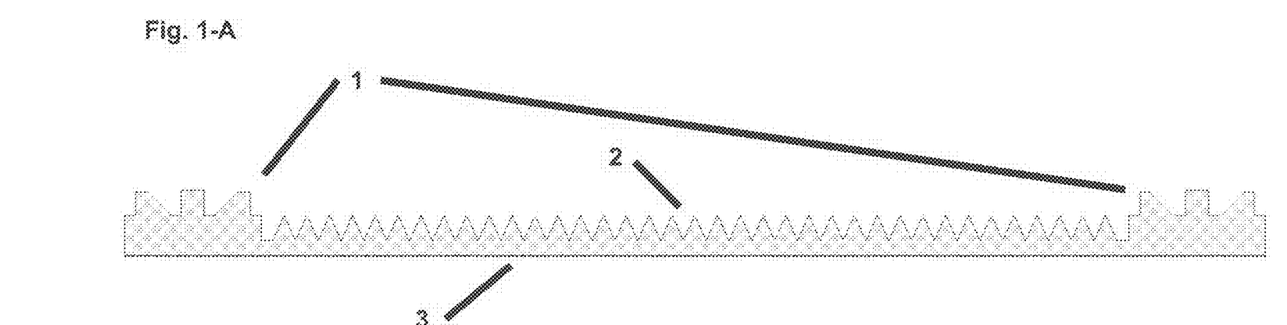
FIG. 1 shows the key elements of the present invention in multiple cross-sectional views.

FIG. 1 shows the basic configuration of the invention in cross-sectional views. Traffic can approach the traffic stripe in these views from the left or right directions in FIG. 1. FIG. 1-A shows the three different types of prismatic patterns formed onto the top and bottom surfaces of the transparent polymer traffic stripe. A repeating pattern 1 of dry weather light-turning prisms represents the tallest structure formed onto the top surface. This repeating pattern 1 is widely spaced apart along the traffic stripe. The repeating pattern 1 shown in FIG. 1-A is bidirectional for traffic coming from either the left or right directions, since the pattern 1 includes both left-facing and right-facing light-turning prisms. In between the repeating pattern 1 of light-turning prisms, a second type of wet weather prisms 2 are formed into the top surface. These wet weather prisms are located in a plane below the dry weather prisms 1.

FIG. 1-B shows the dimensions of a preferred embodiment of the new traffic stripe. While other dimensions can be selected for other embodiments which clearly fall within the scope and spirit of the present invention, the dimensions shown in FIG. 1-B represent a functional, cost-effective version of the new traffic stripe. FIG. 1-C shows a blow-up view of a portion of the traffic stripe, identifying the left-facing dry weather light-turning prism 4, the right-facing dry weather light-turning prism 5, and a taller structural bar 6 which provides some protection against traffic damage for the light-turning prisms 4 and 5. FIG. 1-C also shows the triangular wet weather prisms 7 between and below the repeating pattern 1 of dry weather light-turning prisms. FIG. 1-C also shows the cube corner prisms 3 which fill the bottom surface of the traffic stripe. These cube corner retroreflective prisms 3 are typically smaller in extent than the dry weather light-turning prisms 1 or the wet weather triangular prisms 2 to maximize retroreflective performance, as fully explained in the '021 patent.

Figure 2:
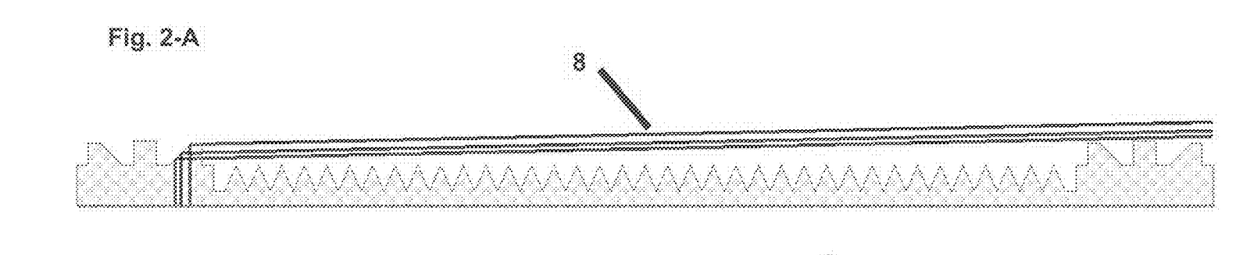

FIG. 2 shows the optical functionality of the new traffic stripe, including both dry weather and wet weather ray traces of incident and retroreflected rays. FIG. 2-A shows the dry weather functionality of the traffic stripe. Incident rays 8 from approaching headlights intercept the dry weather light-turning prisms which redirect these rays downward onto cube corner prisms on the bottom surface of the traffic stripe which retroreflect the rays 8 in the reverse direction. Rays 8 represent both incident and retroreflected rays since both sets of rays follow the same path in reverse directions. Note in FIG. 2-A that the widely spaced dry weather light-turning prisms do not interfere significantly with the incident or retroreflected rays 8 because of the wide spacing.

FIG. 2-B shows the wet weather functionality of the new traffic stripe. Incident rays 9 first intercept a layer of water 10 covering the traffic stripe. This layer of water 10 represents rainwater runoff on a night with heavy precipitation. After intercepting the water, the rays 9 are refracted by the water into a less grazing angle, typically about 49 degrees off vertical or 41 off horizontal. These rays 9 next intercept the triangular wet weather prisms which redirect the rays downward onto the cube corner prisms on the bottom surface of the traffic stripe.

FIG. 2-C shows a blow-up view of the dry weather prisms and incident and retroreflected rays 8. FIG. 2-D shows a blow-up view of the wet weather prisms and incident and retroreflected rays 9. For both dry and wet conditions and for both dry and wet prisms, total internal reflection (TIR) accounts for all of the reflections for incident and retroreflected rays. No metallization of the prisms is needed. TIR is theoretically 100% efficient, leading to very high retroreflectivity for the new traffic stripe under either dry or wet conditions. The cube corner prisms 3 on the bottom surface perform best for rays that are nearly perpendicular to the surface into which they are formed, namely the bottom surface for the new traffic stripe. Note that both the dry weather light-turning prisms and the wet weather triangular prisms enable incident and retroreflected rays to proceed nearly vertically which meets the needs of the cube corner prisms 3 for nearly perpendicular incidence and retroreflection angles for both dry rays 8 and wet rays 9.

While FIG. 2-A shows the dry weather optical functionality of the present invention and FIG. 2-B shows the very wet weather optical functionality of the present invention, the present invention will function extremely well under intermediate conditions wherein the traffic stripe is wet but not fully submerged by water. As one of ordinary skill in the art will easily recognize, both dry weather and wet weather prisms may contribute to retroreflectivity under such intermediate weather conditions characterized by partial submersion of the traffic stripe by rainwater runoff.

Figure 3:
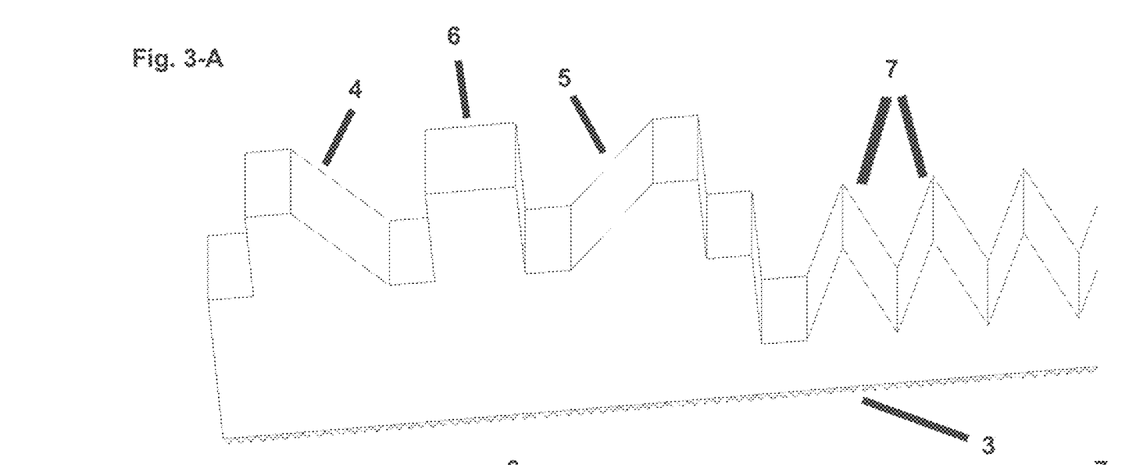

FIG. 3 shows three-dimensional isometric views of the structure of the three types of prisms on the top and bottom surfaces of the new traffic stripe. FIG. 3-A shows a top view and FIG. 3-B shows a bottom view, both including the left-facing dry weather light-turning prism 4, the right-facing light-turning prisms 5, the taller structural bar 6 for traffic protection, the wet weather triangular prisms 7, and the cube corner retroreflective prisms 3 covering the bottom surface of the traffic stripe. The dry weather light-turning prisms 4 and 5 typically have a vertical surface facing the oncoming traffic and a 45-degree sloped surface for redirecting by TIR the incident rays downward onto the cube corner retroreflective prisms 3. The wet weather triangular prisms 7 are typically isosceles in structure to provide the same performance for traffic approaching in either direction. The cube corner retroreflective prisms 3 on the bottom surface of the traffic stripe are typically smaller in size than the prisms 4, 5, and 7 on the top surface to provide better retroreflective performance, as fully quantified in the '021 patent.

Figure 4:
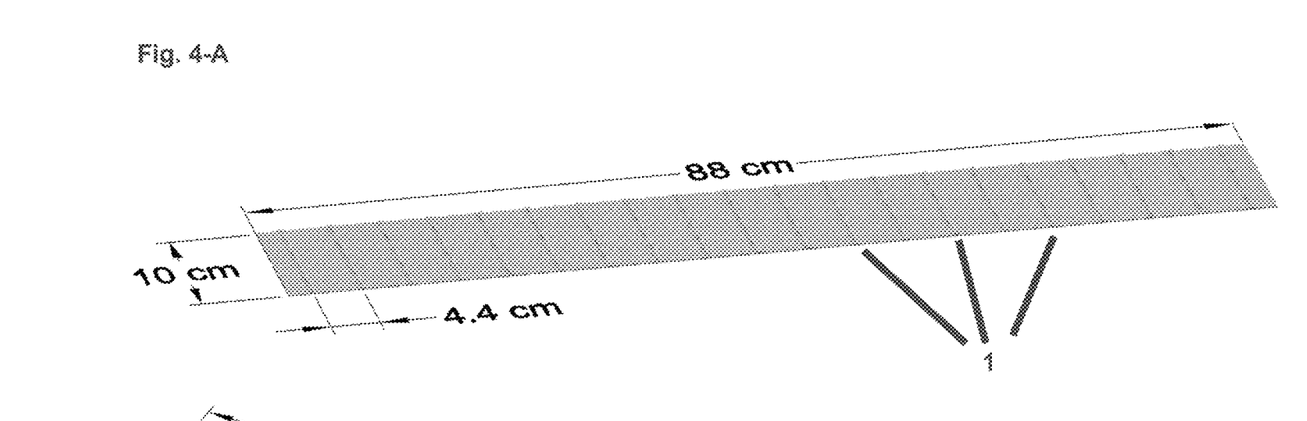
FIG. 4 shows some typical dimensions of two preferred embodiments of the present invention.

FIG. 4 shows additional views of typical traffic stripes using the new prismatic structures of the present invention. FIG. 4-A shows an example embodiment of a longitudinal traffic stripe, such as an edge stripe, a lane stripe, or a centerline skip stripe, parallel to the roadway. FIG. 4-B shows an example embodiment of a transverse traffic stripe, such as a crosswalk stripe or an intersection stripe. The repeating pattern of dry weather light-turning prisms 1 must be oriented perpendicular to oncoming traffic, requiring a different layout for the longitudinal stripe shown in FIG. 4-A than in the transverse stripe shown in FIG. 4-B. The same cross-sectional shapes and dimensions shown previously in FIGS. 2 and 3 will work equally well for either longitudinal or transverse traffic stripes, provided that the orientation of the prismatic patterns is selected properly. One of ordinary skill in the art will quickly recognize the proper orientation of the prismatic structures for these two different embodiments.

The traffic stripes shown in FIG. 4 are about 10 cm wide by a much longer dimension in the lengthwise direction. The 10 cm width is typical of traffic stripes in the U.S. European countries often prefer 15 cm widths for their traffic stripes. The present invention can be applied in either desired width or any other desired width. The length of traffic stripes is often very long for longitudinal stripes and often equal to the roadway width for transverse stripes. The present invention could be made as a continuous tape product or could be made as a segmented product with segments placed end to end to create long traffic stripes. There are advantages and disadvantages with both approaches, and the present invention can be made to match either approach or both approaches. FIG. 4 shows just example embodiments about 88-100 cm in length, but any length will fit within the scope and spirit of the present invention.

Figure 5:
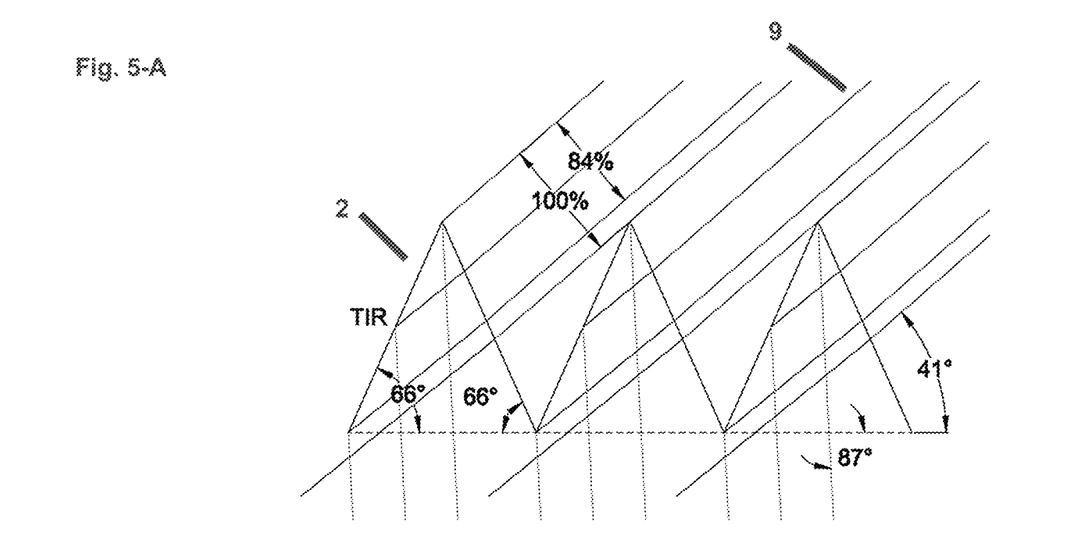
FIG. 5 shows some of the optical considerations of the wet weather prisms on the top surface of the present invention.

FIG. 5 shows more details of the configuration and optical functionality of the wet weather prisms 2. FIG. 5-A shows a preferred embodiment of the wet weather prisms 2, with prism face angles 66 degrees off horizontal for both sides of the isosceles triangle prisms for the presently preferred material, aliphatic thermoplastic urethane (TPU), which has a refractive index of about 1.5. When the incident rays 9 arrive at the triangular prisms 2 after having been refracted by the layer of water above the traffic stripe, these rays enter the first face of these polymer prisms and are totally internally reflected (TIR) by the second face of these prisms downward onto cube corner prisms which cover the bottom surface of the traffic stripe. For this preferred embodiment of the wet weather prisms, 84% of the incident rays 9 are redirected downward by TIR within 3 degrees of a vertical path. FIG. 5-B shows results of a parametric study of different isosceles triangle prism angles. The effectiveness represents the fraction of incident rays which undergo TIR at the second prism face. Note that 66-degree prisms provide 84% effectiveness, as previously shown in FIG. 5-A. Higher angles are not effective because TIR fails for angles larger than about 66.5 degrees. Our preferred embodiment is therefore about 66 degrees for the currently preferred material, aliphatic thermoplastic polyurethane (TPU), which has a refractive index of about 1.5. Those of ordinary skill in the art will easily calculate the best prism angles for other materials, using results like those in FIG. 5-B to guide the selection.

Figure 6:
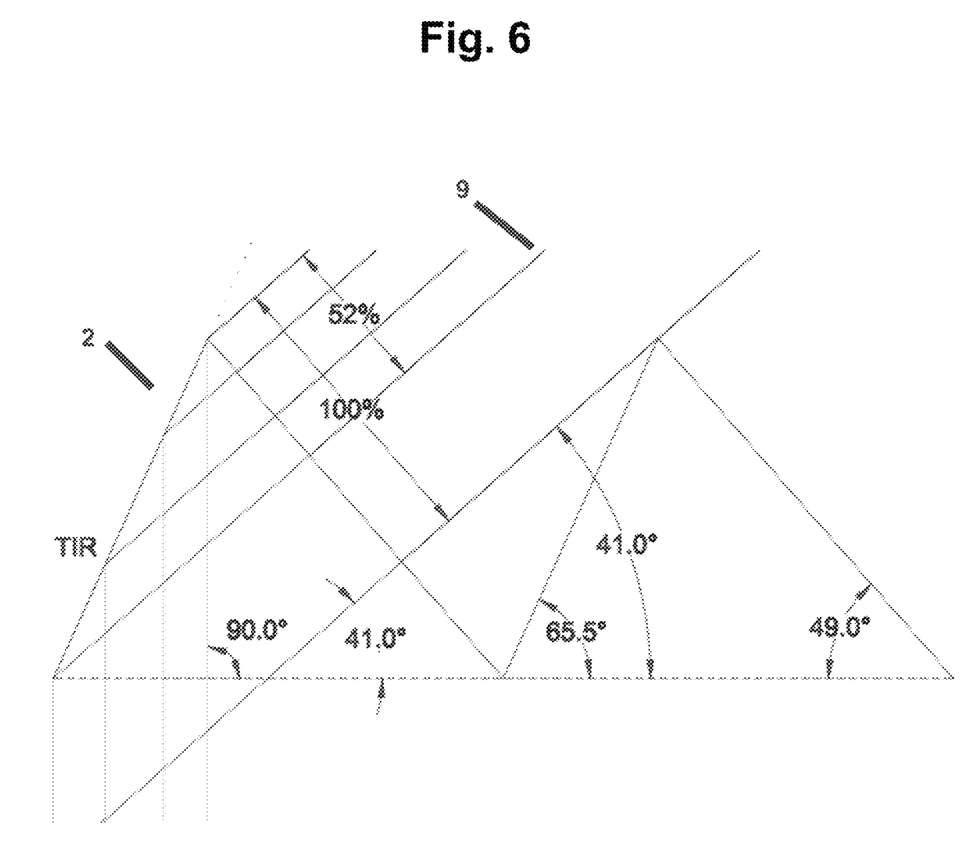

FIG. 6 shows another example embodiment of the new wet weather prisms. If a traffic stripe does not need to work in both directions of travel, the prisms 2 do not have to be isosceles in geometry. The angles shown in FIG. 6 are just one example of a non-isosceles prism geometry. Many other angles may be selected which provide some TIR functionality under wet weather conditions. All such variations in the selection of prism angles clearly fall within the scope and spirit of the present invention.

The key features of the present invention are the combination of two different types of prisms on the top surface of a polymer traffic stripe, one type for dry weather conditions and the other for wet weather conditions, and a third type of prisms, namely cube corner retroreflective prisms, on the bottom surface of the traffic stripe. Many variations of the combination of these three types of prisms can be envisioned by those of ordinary skill in the art after viewing the specification and drawings of the present invention. All of these many variations and embodiments fall within the scope and spirit of the present invention.

Figure 7:
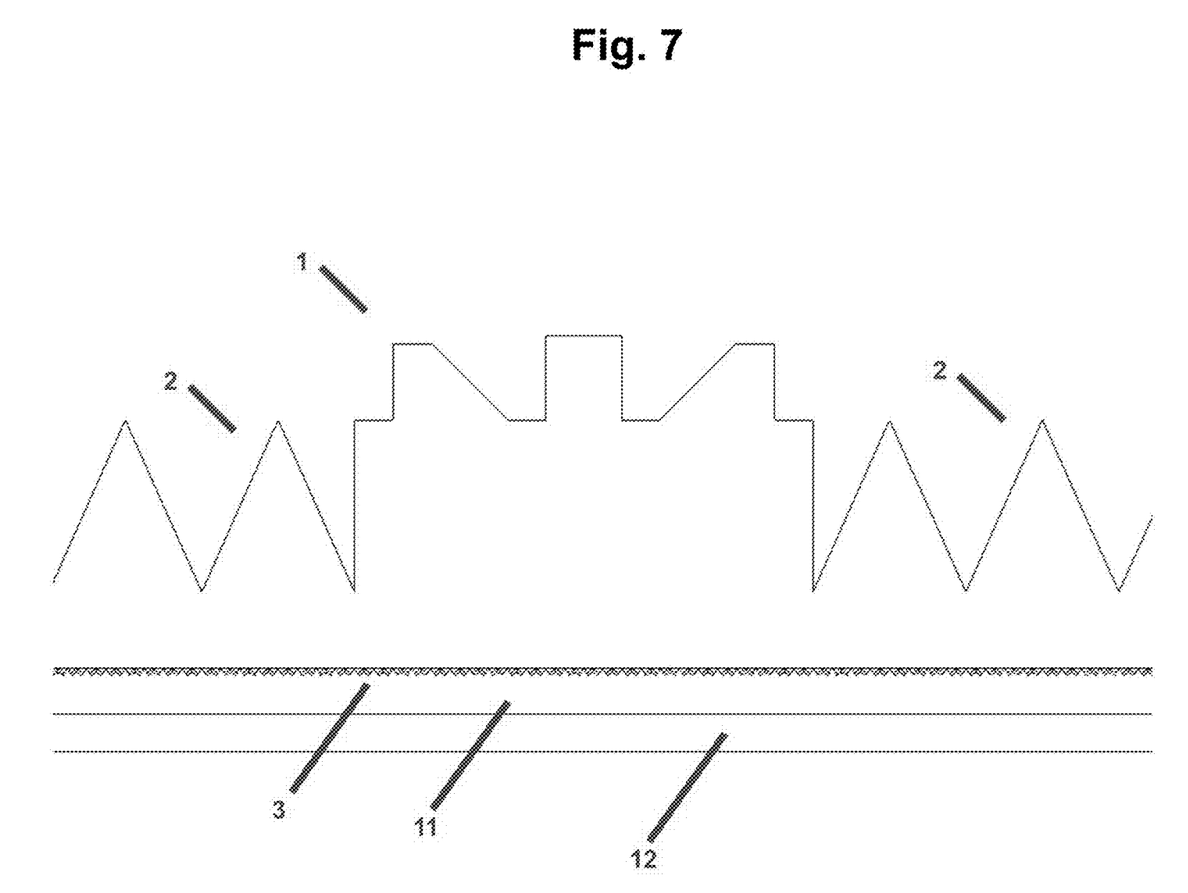

FIG. 7 shows another typical feature of a preferred embodiment of the present invention. The traffic stripe includes the dry weather light-turning prisms 1 and the wet weather triangular prisms 2 on the top surface, and the cube corner retroreflective prisms 3 on the bottom surface. Beneath the cube corner prisms 3, a dead air space 11 is highly desirable to enable TIR to occur under wet or dry weather conditions. This dead air space can be created by adding a white film 12 to the traffic stripe. The use of dead air spaces and white film has been widely and successfully used for retroreflective cube corner prismatic sheeting for traffic signs for many years. The white film further provides brightness under daytime conditions with sunlight providing the illumination rather than headlights. The present invention will likewise benefit from a white film beneath the traffic stripe providing this dual functionality of dead air containment and daytime visibility. While not shown in FIG. 7, an additional layer of pressure sensitive adhesive (PSA) could be added to the bottom layer of the white film 12, as is often done with traffic sign prismatic sheeting materials.

Figure 8:
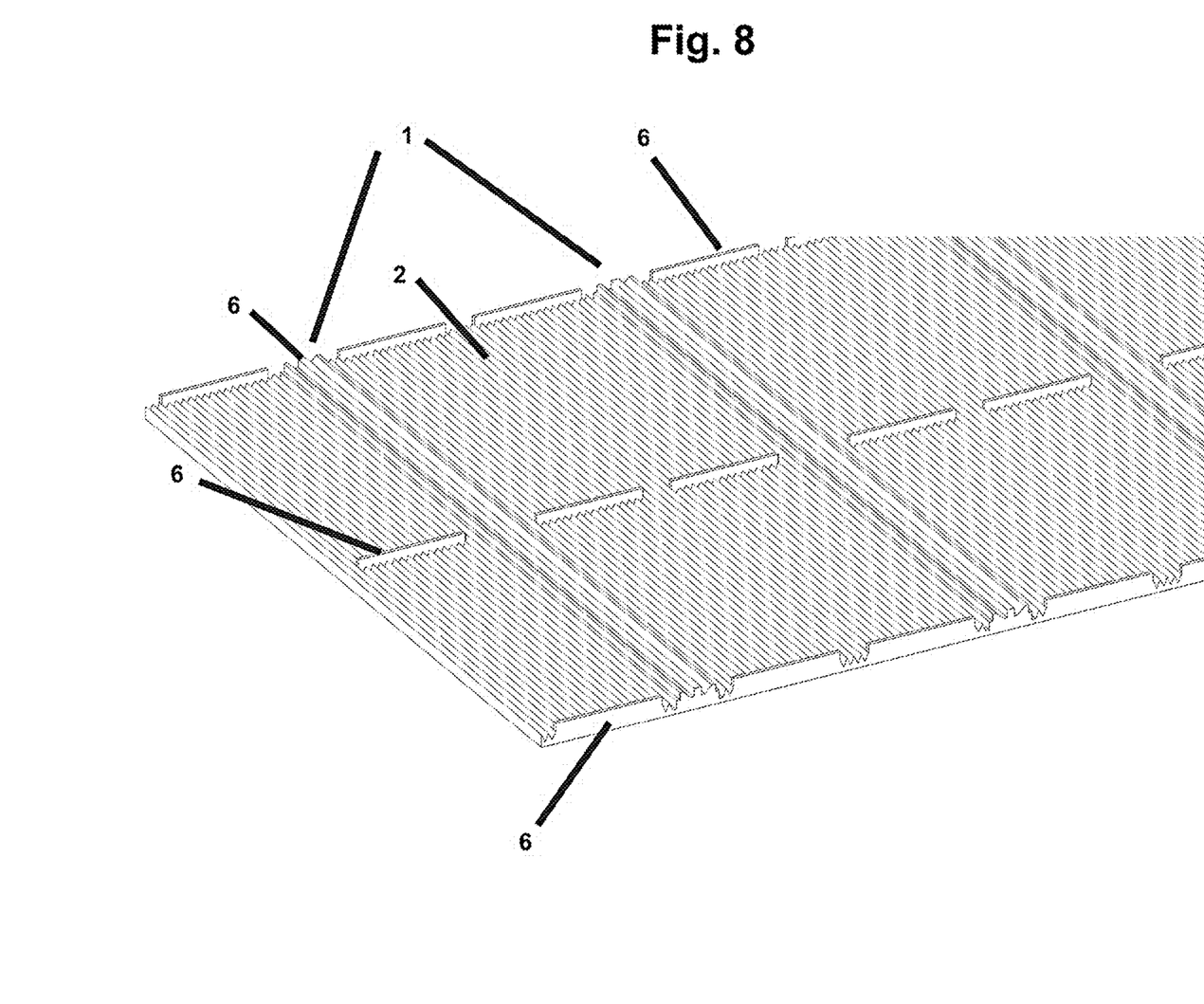

FIG. 8 shows another embodiment of the present invention, including not only the repeating pattern 1 of dry weather light-turning prisms and wet weather prisms 2 on the top surface, but also raised structural bars 6 for traffic protection in multiple locations over the top surface of the traffic stripe. These taller structural bars 6 can be simultaneously formed into the top surface during embossing or molding of the patterns of the dry weather prisms 1 and the wet weather prisms 2.

There are at least two acceptable methods of mass producing the prismatic polymer film employed in the present invention. One method is to first produce a separate prismatic film containing the repeating pattern 1 of dry weather light-turning prisms and wet weather prisms 2 on one side of this first film, with the opposite side smooth and planar. A second separate prismatic film is produced containing cube corner prisms 3 on one side, with the opposite side smooth and planar. The smooth and planar surfaces of the first and second films are later bonded together, using a transparent bonding agent such as solvent or liquid adhesive or pressure sensitive adhesive to bond the two films together. Both the first and second prismatic films can be produced by thermally embossing a transparent polymer film, the same embossing method commonly used to produce the reflective sign sheeting. Other processes can also be used to produce the prismatic films including injection molding, compression molding, and casting.

An alternate method of mass producing the prismatic polymer film is to simultaneously form both sets of prisms, namely the dry weather light-turning prisms 1 and the wet weather triangular prisms 2 on one side of the film and the cube corner prisms 3 on the opposite side of the film. This alternate method will require tooling with both prismatic patterns on opposite sides of the polymer being formed into the traffic stripe. The inventor has had discussions with long-time suppliers of prismatic sheeting for road signs and found that the simultaneous embossing or molding of both patterns onto a single polymer film should be practical and cost-effective. The first method of producing the prismatic polymer film may be easier to implement in the short term, but the second method will be more cost-effective in the long term and offer a more robust product since no bonding layer will be present.

For a very near-term product, the present invention provides a significant benefit over the invention described in the '935 patent for providing outstanding wet weather retroreflectivity. The invention in the '935 patent requires a relatively complex bottom surface cube corner prismatic pattern comprising two different types of cube corner prisms, one set with nearly vertical optical axes and another set with substantially tilted optical axes. This novel cube corner prismatic pattern described in the '935 patent is not yet available as a commercial product, and will require a substantial investment in new tooling to make available.

The present invention requires a much simpler bottom surface cube corner prismatic pattern comprising only one set of cube corner prisms with nearly vertical or slightly tilted optical axes. Currently mass produced and commercially available cube corner sheeting for traffic signs can be successfully used for the bottom surface cube corner prismatic pattern of the present invention. Such cube corner prismatic sign sheeting is available from several manufacturers, including 3M, Avery Dennison, and Orafol.

Some of these commercially available cube corner sheeting products for traffic signs include:
3M™ Diamond Grade™ DG³ Reflective Sheeting
Avery Dennison OmniCube™ Reflective Sheeting
Orafol ORALITE® 9910 Brilliant Grade Premium Reflective Sheeting These commercially available sheeting products are available not only in clear white but also in a number of pigmented colors including yellow, red, and blue. These commercially available sheeting products further include sealed air pockets and white film below the cube corner prisms, as well as pressure sensitive adhesive on the very bottom surface.

In the present invention, such commercially available sign sheeting can be laminated to a new top surface prismatic film comprising the two sets of top surface prismatic patterns thoroughly described previously in this specification. This lamination is readily accomplished with transparent adhesives, including commercially available acrylic pressure sensitive adhesives (PSAs) such as 3M VHB 4905. While the new top surface prismatic pattern with both dry weather and wet weather prismatic patterns has not yet been developed, the top surface prismatic pattern with the dry weather prismatic pattern has been developed by the inventor's company, Mark O'Neill, LLC, and has been made into fully functional prototypes by laminating this top surface prismatic film to commercially available cube corner prismatic sheeting with outstanding results, summarized in the table below. Road Vista/Gamma Scientific performed these certified retroreflectivity tests on Nov. 30, 2021, in their laboratory according to ASTM Standards D4061, E809, and E1710, and CEN Standard EN1436. The first row in the table shows the proposed Federal Highway Administration standard for traffic stripe retroreflectivity for high-speed U.S. roadways. The second row shows test results for the presently brightest traffic stripe product commercially available, 3M's White All-Weather 380 tape. The third row shows test results for a typical prototype of the new road stripe. Note that the new road stripe is more than 270 times brighter than the proposed standard and more than 27 times brighter than the 3M product. The dry weather performance of the present invention will be similar to the prototype results shown below since the configuration of dry weather light-turning prisms on the top surface and cube corner retroreflective prisms on the bottom surface will be similar. The wet weather performance of the present invention has not yet been demonstrated, since new tooling will be needed to produce both patterns of top surface prisms including the wet weather prisms.

| Sample | Certified Retroreflectivity Measurement |
| --- | --- |
| Proposed FHWA Standard | 100 mcd/sq.m.-lux |
| 3M White AW380 Tape | 989 mcd/sq.m.-lux |
| Dry Weather Light-Turning Prismatic Pattern Laminated to 3M Diamond Grade Cubed Sign Sheeting | 27,390 mcd/sq.m.-lux |

While the above paragraphs have fully described the invention and its best mode of implementation so that one of ordinary skill in the art can fully practice the invention, many other variations and embodiments of the invention will become apparent to others of ordinary skill in the art based upon the disclosure of this invention. Such variations and embodiments fall within the scope and spirit of the invention.

I claim:
1. A traffic stripe attached to a mounting surface and providing high retroreflectivity at night when illuminated by distant headlights under both dry and wet conditions,
   a. Said traffic stripe comprising a transparent polymer film with two discrete types of prismatic patterns on its exposed top surface and a third prismatic pattern on its bottom surface proximate said mounting surface,
   b. Said top surface first prismatic pattern comprising a repeating set of spaced apart light-turning prisms which accept light from said distant headlights and refract and reflect said light into a downward direction onto said bottom surface,
   c. Said top surface second prismatic pattern comprising prisms between said first set of spaced apart light-turning prisms wherein said second prismatic pattern accepts light from distant headlights after said light is refracted by a layer of water above said traffic stripe and further refracts and reflects said light downward onto said bottom surface, d. Said bottom surface prismatic pattern comprising a set of cube corner prisms which accept and retroreflect said light in the reverse direction.

2. The retroreflective traffic stripe of claim 1 comprising symmetrical top surface prismatic patterns functional for both directions of traffic.

3. The retroreflective traffic stripe of claim 1 comprising repeating structural elements proximate to and taller than said top surface prismatic patterns to mitigate traffic damage to said prismatic patterns.

4. The retroreflective traffic stripe of claim 1 wherein said polymer film is selected from thermoplastic polyurethane, acrylic, polycarbonate, silicone, fluoropolymer, and combinations thereof.

5. The retroreflective traffic stripe of claim 1 wherein said prismatic patterns are formed into said polymer film by a manufacturing process selected from roll-to-roll embossing, injection molding, compression molding, or casting.

6. The retroreflective traffic stripe of claim 1 wherein said traffic stripe further comprises an enclosed air gap beneath said retroreflective cube corner prisms to promote total internal reflection therefrom.

7. The retroreflective traffic stripe of claim 1 wherein said traffic stripe further comprises a white polymer film layer beneath said retroreflective cube corner prisms to provide daytime brightness under sunlight.

8. The retroreflective traffic stripe of claim 1 wherein said transparent polymer includes a pigment for coloration of said traffic stripe.

9. The retroreflective traffic stripe of claim 1 wherein said bottom surface is proximate to a road surface.

10. A retroreflective traffic stripe configured to be horizontally attached to a highway, said traffic stripe having a length parallel to the direction of traffic and a width perpendicular to the direction of traffic, said traffic stripe comprising the following:
   a. A substantially transparent polymeric material having an upper surface exposed to the ambient environment and a lower surface facing said highway below,
   b. Said upper surface comprising a first plurality of linear light-turning prisms extending substantially across the width of said traffic stripe in a spaced apart repeating pattern along the length of said traffic stripe,
   c. Said upper surface further comprising a second plurality of linear prisms between said spaced apart light-turning prisms extending substantially across the width of said traffic stripe,
   d. Said first plurality of light-turning prisms configured to accept and retroreflect light from approaching headlights under dry weather conditions,
   e. Said second plurality of prisms configured to accept and retroreflect light from approaching headlights under wet weather conditions,
   f. Said lower surface comprising a plurality of cube-corner retroreflective prisms,
   g. Said cube-corner retroreflective prisms being surrounded by air spaces below said prisms to enable total internal reflection by said prisms.

11. The retroreflective traffic stripe of claim 10 comprising symmetrical pluralities of upper surface prisms providing the same retroreflective performance for traffic approaching in both directions.

12. The retroreflective traffic stripe of claim 10 comprising repeating structural elements proximate to and taller than said pluralities of upper surface prisms to mitigate traffic damage to said prisms.

13. The retroreflective traffic stripe of claim 10 wherein said polymeric material is selected from thermoplastic polyurethane, acrylic, polycarbonate, silicone, fluoropolymer, and combinations thereof.

14. The retroreflective traffic stripe of claim 10 wherein said pluralities of upper surface prisms and said lower surface cube-corner prisms are formed into said polymeric material by a manufacturing process selected from roll-to-roll embossing, injection molding, compression molding, or casting.

15. A retroreflective traffic stripe comprising a polymer film comprising the combination of three different types of prisms, two on the exposed top face of said film and one on the bottom surface of said film, to accept light from distant headlights and to return a portion of said light to the driver and sensors of the vehicle under both dry and wet road conditions, said prisms comprising:
   a. on said exposed top surface, a spaced apart repeating pattern of light-turning prisms which accept light from said distant headlights and refract and reflect said light downward onto said bottom surface under dry weather conditions,
   b. on said exposed top surface, between said spaced apart pattern of light-turning prisms, a second pattern of prisms which accept light from said distant headlights and refract and reflect said light downward onto said bottom surface under wet weather conditions,
   c. on said bottom surface, a prismatic pattern comprising a set of cube corner prisms which accept and retroreflect said light in the reverse direction.

16. The retroreflective traffic stripe of claim 15 comprising symmetrical patterns of said top surface prismatic patterns to provide equal retroreflective performance for both directions of traffic.

17. The retroreflective traffic stripe of claim 15 comprising repeating structural elements proximate to and taller than said top surface prismatic patterns to mitigate traffic damage to said prismatic patterns.

18. The retroreflective traffic stripe of claim 15 wherein said polymeric material is selected from thermoplastic polyurethane, acrylic, polycarbonate, silicone, fluoropolymer, and combinations thereof.

19. The retroreflective traffic stripe of claim 15 wherein said top surface prismatic patterns and said bottom surface cube-corner prisms are formed into said polymeric material by a manufacturing process selected from roll-to-roll embossing, injection molding, compression molding, or casting.

* * * * *